US012759072B2

(12) United States Patent
Yasuda et al.

(10) Patent No.: US 12,759,072 B2
(45) Date of Patent: Oct. 13, 2026

(54) MANUFACTURING METHOD OF WELDED MEMBER

(71) Applicant: FUTABA INDUSTRIAL CO., LTD., Okazaki (JP)

(72) Inventors: Keigo Yasuda, Okazaki (JP); Shota Muto, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 742 days.

(21) Appl. No.: 18/296,030

(22) Filed: Apr. 5, 2023

(65) Prior Publication Data

US 2023/0330766 A1 Oct. 19, 2023

(30) Foreign Application Priority Data

Apr. 13, 2022 (JP) ................................ 2022-066383

(51) Int. Cl.
*B23K 11/14* (2006.01)
*B23K 11/16* (2006.01)

(52) U.S. Cl.
CPC .............. *B23K 11/14* (2013.01); *B23K 11/16* (2013.01)

(58) Field of Classification Search
CPC ....... B23K 11/14; B23K 11/16; B23K 11/255; B23K 11/31; B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066
USPC ............... 219/91.2, 86.9, 86.41, 86.51, 78.1, 219/121.63, 121.64, 136, 119, 110
See application file for complete search history.

(56) References Cited

U.S. PATENT DOCUMENTS

| | | | | |
|---|---|---|---|---|
| 4,751,365 A * | 6/1988 | La Rocca | ............ | B23K 1/0056 219/121.64 |
| 5,278,878 A | 1/1994 | Porowski | | |
| 2015/0239061 A1* | 8/2015 | Hamlock | ............ | B23K 11/004 219/93 |

FOREIGN PATENT DOCUMENTS

| | | |
|---|---|---|
| JP | 2012179646 A | 9/2012 |
| JP | 2013078784 A | 5/2013 |
| JP | 2013163212 A | 8/2013 |

(Continued)

OTHER PUBLICATIONS

Japanese Notice of Reasons for Refusal dated Mar. 12, 2024 for corresponding Japanese Application No. 2022-066383, filed Apr. 13, 2022.

(Continued)

*Primary Examiner* — Phuong T Nguyen
(74) *Attorney, Agent, or Firm* — David D. Brush; Westman, Champlin & Koehler, P.A.

(57) ABSTRACT

Disclosed is a method for manufacturing a welded member in which a workpiece made of a high tensile material and a welding object are welded. The method includes welding the workpiece and the welding object such that welded portions are formed between the workpiece and the welding object by performing projection welding. The method also includes applying a cancellation stress to the welded member after the projection welding, so that a stress that is generated in the welded portions after the projection welding and acts in a direction to pull the welded portions close to each other is canceled.

8 Claims, 5 Drawing Sheets

(56) References Cited

FOREIGN PATENT DOCUMENTS

KR 20160080245 A 7/2016

OTHER PUBLICATIONS

Chinese Office Action dated Aug. 29, 2025 for corresponding Chinese Application No. 202310389145.4.
German Office Action dated Aug. 26, 2025 for corresponding German Application No. 102023107700.7.
Chinese Second Office Action dated Mar. 5, 2026 for corresponding Chinese Application No. 202310389145.4.

* cited by examiner

MANUFACTURING METHOD OF WELDED MEMBER

CROSS-REFERENCE TO RELATED APPLICATIONS

This application claims the benefit of Japanese Patent Application No. 2022-066383 filed on Apr. 13, 2022 with the Japan Patent Office, the entire disclosure of which is incorporated herein by reference.

BACKGROUND

The present disclosure relates to a method for manufacturing a welded member.

There is a known technique of welding a welding nut around a hole of a workpiece by projection welding. In a welded portion between the workpiece and the welding nut that is formed by the projection welding, a stress is generated due to cooling after the welding. Due to the stress that remains, delayed fracture may tend to occur in the welded portion.

Japanese Unexamined Patent Application Publication No. 2012-179646 discloses a structural member for automobile, and a method for manufacturing the same, excellent in delayed fracture property of a welded portion between a workpiece and a welding nut welded by projection welding. The structural member for automobile uses a welding nut having projections on a welding surface which is a surface welded onto the workpiece. The projections are melted by electric current applied by the projection welding to form the welded portion between the workpiece and the welding nut. To reduce a residual stress that causes delayed fracture of the welded portion during the projection welding, a depression is provided around each projection on the welding surface in the welding nut. The total volume of the respective depressions ranges from 0.7 to 1.3 times the total volume of the respective projections.

SUMMARY

The method of reducing delayed fracture of a welded portion by projection welding as described above requires use of a welding nut with a novel shape that has depressions in addition to projections for projection welding. However, it is desirable that delayed fracture of the welded portion by projection welding is reduced even in a case of using a welding nut that does not have a special shape as described above.

In one aspect of the present disclosure, it is desirable to provide a novel method for manufacturing a welded member in which delayed fracture of welded portions by projection welding is reduced.

One aspect of the present disclosure is a method for manufacturing a welded member in which a workpiece made of a high tensile material and a welding object are welded. The method comprises welding the workpiece and the welding object such that welded portions are formed between the workpiece and the welding object by performing projection welding. The method also comprises applying a cancellation stress to the welded member after the projection welding, so that a stress that is generated in the welded portions after the projection welding and acts in a direction to pull the welded portions close to each other is canceled.

The configuration as above generates a cancellation stress in the welded member after projection welding. The cancellation stress acts in a direction to cancel a stress generated in the welded portions formed by the projection welding. Thus, the cancellation stress can reduce the stress that remains in the welded portions and causes delayed fracture of the welded portions. As a result, delayed fracture of the welded portions by the projection welding can be reduced. Also, in a case of reducing delayed fracture of the welded portions during projection welding, it is necessary to consider complicated requirements such as heat quantity. On the other hand, in a case of applying a cancellation stress in a process after projection welding, there is no necessity to consider the complicated requirements such as heat quantity. Delayed fracture of the welded portions can be easily reduced.

In one aspect of the present disclosure, the cancellation stress may be generated by applying a load to a load target which is a target portion of the welded member to which the load is applied. The configuration as above allows generation of a cancellation stress, after the projection welding, in a relatively easy manner of directly applying the load to the load target of the welded member.

In one aspect of the present disclosure, the load target may be a nut which is the welding object. The cancellation stress may be generated by using a member arranged along a central axis of a screw hole of the nut to apply a load to the nut in a direction in which the nut moves away from the workpiece. The configuration as such causes plastic deformation around the welded portions in the welded member by pushing or pulling the nut in the direction in which the nut moves away from the workpiece. Specifically, a stress that causes downward warpage and bend acts around the welded portions in the workpiece. As a result, a cancellation stress can be generated in the welded member. Also, since the member arranged along the central axis is used, a cancellation stress that can evenly reduce delayed fracture of the welded portions is easily generated.

In one aspect of the present disclosure, the load target may be the workpiece. The welding object may be a nut. The cancellation stress may be generated by compressing surroundings of the nut in the workpiece in a thickness direction of the workpiece. The configuration as such causes plastic deformation around the welded portions in the welded member by compressing the workpiece. Specifically, since a stress that causes contraction around the welded portions in the workpiece acts, a stress that causes downward warpage and bend acts around the welded portions in the workpiece. As a result, a cancellation stress can be generated in the welded member.

In one aspect of the present disclosure, the cancellation stress may be generated by pushing the nut in a direction in which the nut moves away from the workpiece. With the configuration as such, the cancellation stress can be easily generated simply by pushing the nut.

In one aspect of the present disclosure, the cancellation stress may be generated by pulling the nut in a direction in which the nut moves away from the workpiece. With the configuration as such, the cancellation stress can be easily generated simply by pulling the nut.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Configuration

<Welded Member>

Figure 1:
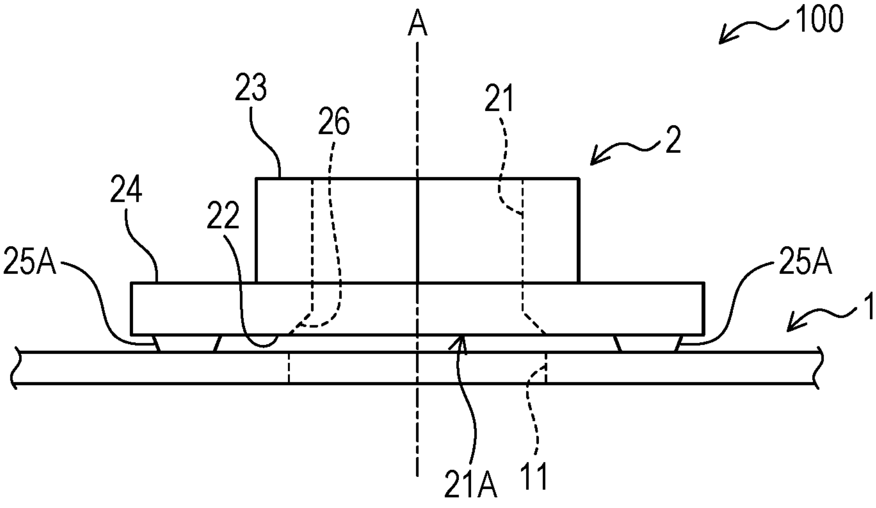
FIG. 1 is a schematic diagram showing a welded member in which a workpiece and a welding nut are welded.

A welded member 100 shown in FIG. 1 is a member in which a workpiece 1 and a welding nut 2, which is a welding object, are welded by projection welding.

The workpiece 1 is a plate-shaped member to which the welding nut 2 is welded. The workpiece 1 is, for example, a thin plate for forming a vehicle body. The workpiece 1 may be made of a high tensile steel, that is, a high tensile material having a tensile strength of 340 MPa or more. Among such high tensile materials, it is preferable that the workpiece is made of a super high tensile steel, that is, a super high tensile material having a tensile strength of 980 MPa or more. The workpiece 1 has at least one hole 11 that passes through the workpiece 1 in a thickness direction of the workpiece 1.

Figure 2:
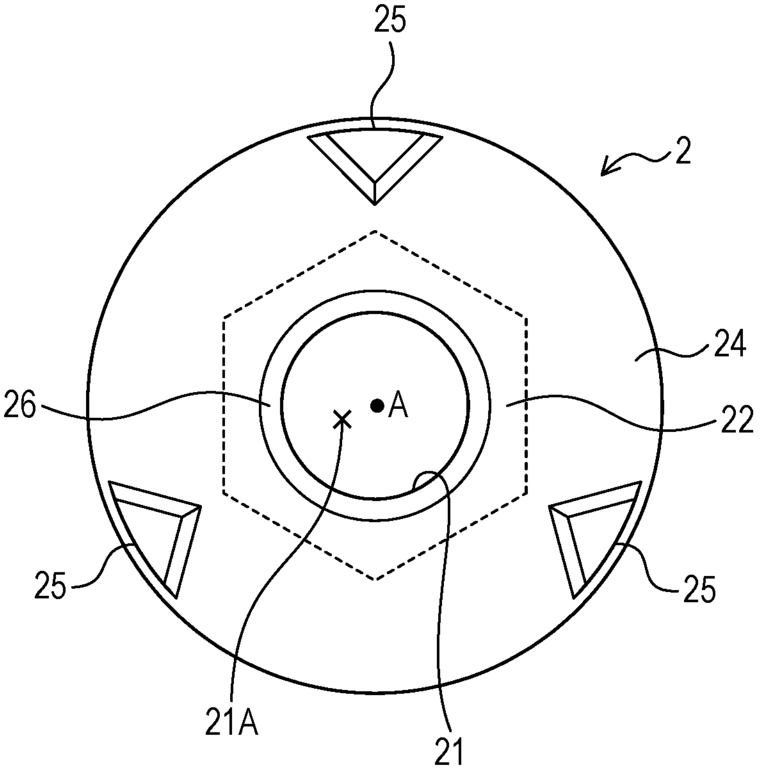
FIG. 2 is a bottom view of the welding nut.

The welding nut 2 is a nut, for example, made of a metal such as iron and used for projection welding. As shown in FIGS. 1 and 2, the welding nut 2 has a screw hole 21, a first end face 22, a second end face 23, a flange 24, three projections 25, and a tapered portion 26.

The screw hole 21 is provided to pass through the welding nut 2. Although not shown in FIG. 1, a female screw is provided on the inner-circumferential surface of the screw hole 21, which can be fastened with a bolt.

The first end face 22 and the second end face 23 are provided to surround openings located on opposite ends of the screw hole 21. The first end face 22 is flat.

The flange 24 is provided to surround an opening 21A of the screw hole 21 of the first end face 22.

The projections 25 are portions to be melt by projection welding. The projections 25 are provided on the first end face 22, and project from the first end face 22. In the present embodiment, as shown in FIG. 2, three projections 25 are provided to surround the opening 21A at approximately regular intervals. The projections 25 each have a triangular shape in a plane view. In the following description, welded portions between the workpiece 1 and the welding nut 2, which are formed by the projections 25 being melt by projection welding and crushed by pressurization, are referred to as welded portions 25A.

The tapered portion 26 is provided on the opening 21A side of the screw hole 21. The tapered portion 26 is a slanted surface that connects the inner-circumferential surface of the screw hole 21 and the first end face 22 and that expands toward the opening 21A of the screw hole 21.

<Method for Manufacturing Welded Member>

Referring to FIGS. 3A to 3F, a method for manufacturing a welded member will be explained in detail.

Figures 3A, 3B, 3C, 3D, 3E, 3F:
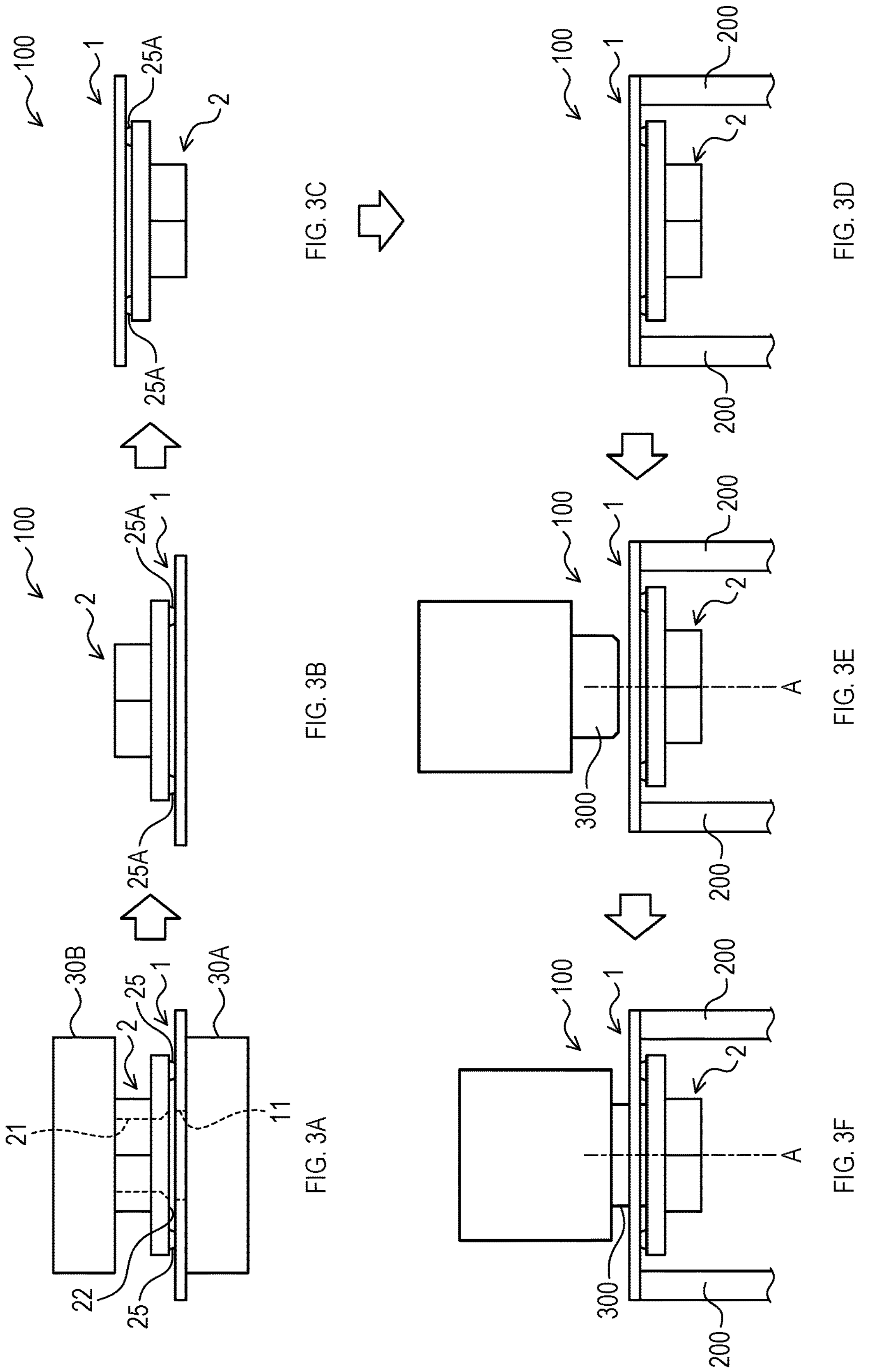
FIG. 3A is a schematic diagram showing the welding nut being welded on the workpiece by projection welding.
FIG. 3B is a schematic diagram showing the welded member immediately after the welding.
FIG. 3C is a schematic diagram of the welded member flipped in an up-down direction.
FIG. 3D is a schematic diagram showing the flipped welded member being set on a receiving stand.
FIG. 3E is a schematic diagram showing the welded member being arranged downward of a pin for applying a load.
FIG. 3F is a schematic diagram showing the pin applying the load to the welding nut in order to generate a cancellation stress in the welded member.

First, as shown in FIG. 3A, the workpiece 1 is arranged on a bottom electrode 30A included in a welding apparatus used for projection welding. Then, the hole 11 of the workpiece 1 and the screw hole 21 of the welding nut 2 are overlapped, and the welding nut 2 is arranged on the workpiece 1 so that the projections 25 contact the workpiece 1. At this time, a gap is formed between the first end face 22 of the welding nut 2 and a surface, of the workpiece 1, which does not contact the bottom electrode 30A. For positioning of the welding nut 2 on the workpiece 1, a positioning pin, which is not shown, provided in the welding apparatus and passes through the hole 11 and the screw hole 21 may be used.

Next, in a state in which the welding nut 2 is arranged on the workpiece 1, the bottom electrode 30A and a top electrode 30B sandwich the workpiece 1 and the welding nut 2 to apply pressure, as shown in FIG. 3A. Then, projection welding is performed in which electric current is applied to the projections 25, which are joining portions, via the bottom electrode 30A and the top electrode 30B, and pressure is applied to the projections 25 to perform joining while the projections 25 is heated by resistance heating. When the projection welding is performed, the three projections 25 are melted and the three welded portions 25A are formed between the workpiece 1 and the welding nut 2 to obtain the welded member 100 immediately after the welding shown in FIG. 3B in which the workpiece 1 and the welding nut 2 are welded. In the welded member 100 immediately after the welding, the welding nut 2 is located above the workpiece 1.

Next, the welded member 100 immediately after the welding is taken out from the welding apparatus. Then, the welded member 100 is inverted so that the welding nut 2 is positioned below the workpiece 1, as shown in FIG. 3C. Thereafter, as shown in FIG. 3D, the inverted welded member 100 is set on the receiving stand 200. The receiving stand 200 is configured to contact the vicinity of the welding nut 2 in the workpiece 1 to support the welded member 100. The receiving stand 200 may have a cylindrical shape so as to surround the welding nut 2.

Next, as shown in FIG. 3E, a load apparatus for applying a load is set so that the welded member 100 is arranged below a pin 300 of the load apparatus. The pin 300 may have a floating mechanism that allows floating of the pin 300 in a horizontal direction.

Figure 4:
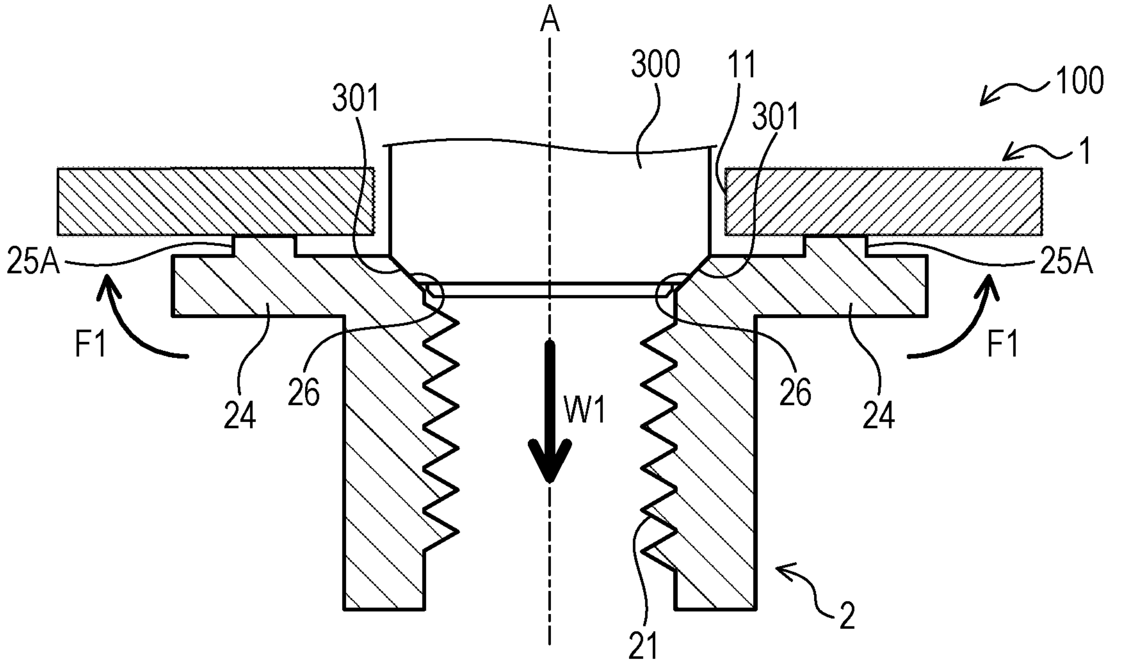
FIG. 4 is a schematic cross-sectional view showing the pin applying the load to the welding nut.
Figure 5:
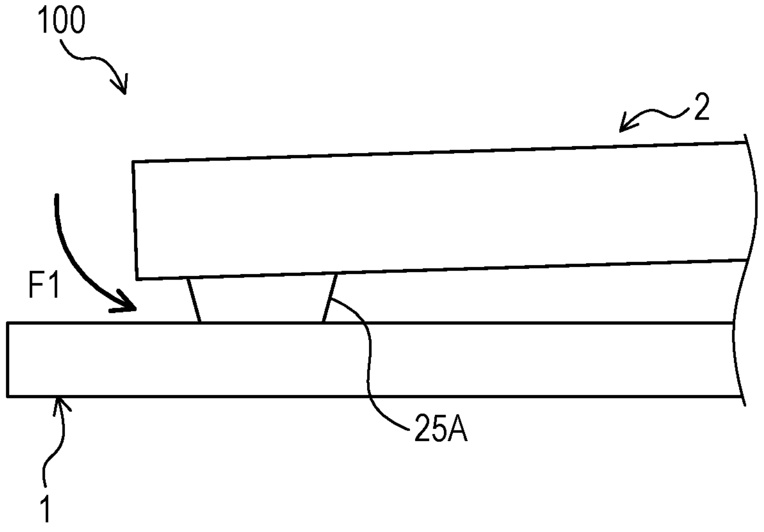
FIG. 5 is a schematic diagram showing the cancellation stress generated in the welded member.

Next, as shown in FIG. 3F, the pin 300 is used to apply a load to the welded member 100. At this time, the pin 300 is arranged along a central axis A of the screw hole 21 of the welding nut 2. For example, a servomotor such as an electric motor and a hydraulic motor is used to apply the load by the pin 300. As shown in FIG. 4, a pin tapered portion 301 is provided at a leading end of the pin 300. The pin tapered portion 301 is a slanted surface that tapers toward the leading end. The pin 300 is inserted to the hole 11 of the workpiece 1. In a state in which the pin tapered portion 301 of the pin 300 contacts the tapered portion 26 of the welding nut 2, the welding nut 2 is pushed downward with the pin 300. By pushing the welding nut 2 with the pin 300, a load W1 is applied to the welding nut 2 along the central axis A in a direction in which the welding nut 2 moves away from the workpiece 1. The load W1 is a force that causes plastic deformation to the flange 24 of the welding nut 2 or around the welded portions 25A of the welding nut 2 which are easily deformed. Since the welding nut 2 is pushed downward and the load W1 is applied to the welding nut 2, a stress that causes downward warpage and bend acts around the welded portions 25A in the workpiece 1. As a result, as shown in FIGS. 4 and 5, a cancellation stress F1 is generated in the welded member 100. The cancellation stress F1 is a force that acts in a direction to cancel a later-described stress F3 shown in FIG. 6.

Figure 6:
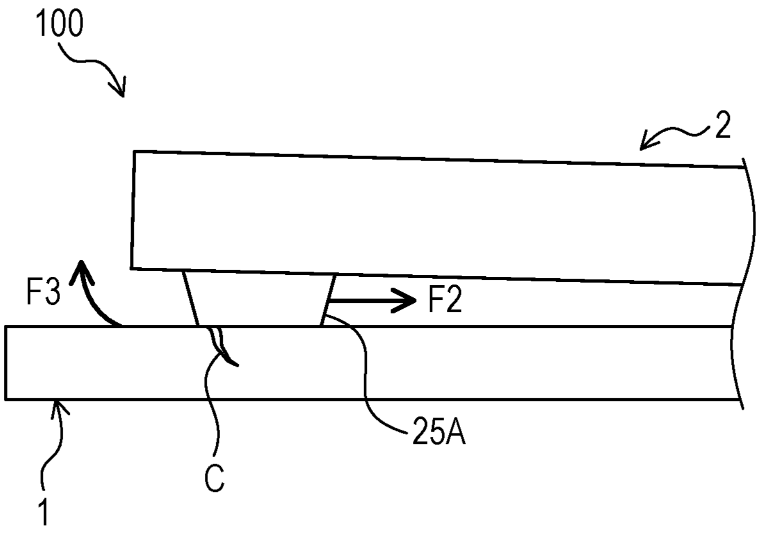
FIG. 6 is a schematic diagram showing delayed fracture of welded portions caused by a stress generated due to cooling of the welded portions after the projection welding.

When the three welded portions 25A that are formed on the welded member 100 after the projection welding are cooled, a stress F2 shown in FIG. 6 is generated. The stress F2 acts in a direction to pull the three welded portions 25A close to each other. In other words, the stress F2 is generated by cooling the three welded portions 25A formed on the welded member 100 after the projection welding, and acts in a direction toward the central axis A relative to the welded portions 25A. The stress F2 acts to cause deformation around the welded portions 25A in the welded member 100. Specifically, the stress F3 that causes upward warpage acts around the welded portions 25A in the workpiece 1 due to the stress F2. However, since the workpiece 1 is made of a super high tensile material, and does not follow a direction of the stress F3, the workpiece 1 is less likely to deform. Thus, delayed fracture like a crack C shown in FIG. 6 may occur around the welded portions 25A in the workpiece 1.

On the other hand, in the present embodiment, the pin 300 is used to apply the load W1 to the welding nut 2 so as to generate the cancellation stress F1 and cancel the stress F3, as described above. As a result, it is possible to cancel the stress F2 that acts to generate the stress F3.

2. Effect

The present embodiment detailed in the above has the following effects.

(2a) In the present embodiment, the cancellation stress F1 is generated in the welded member 100 after the projection welding. The cancellation stress F1 acts in the direction to cancel the stress F3, which is generated by the stress F2 generated by cooling the three welded portions 25A formed by the projection welding. Thus, the stress F2, which remains in the welded portions 25A and causes delayed fracture of the welded portions 25A, can be reduced by the cancellation stress F1. As a result, delayed fracture of the welded portions 25A by the projection welding can be reduced.

Also, in reducing delayed fracture of the welded portions 25A during the projection welding, it is necessary to consider complicated conditions such as heat quantity. On the other hand, in the present embodiment, since the cancellation stress F1 is applied in a process after the projection welding, there is no necessity to consider the complicated conditions such as heat quantity. Delayed fracture of the welded portions 25A can be easily reduced.

(2b) In the present embodiment, the welding nut 2 is pushed downward by the pin 300 to apply the load W1 to the welding nut 2. Thus, plastic deformation occurs around the welded portions 25A of the welded member 100. Specifically, a stress that causes downward warpage and bend acts around the welded portions 25A in the workpiece 1. As a result, the cancellation stress F1 is generated in the welded member 100. The cancellation stress F1 can be generated in a relatively easy way of pushing downward the welding nut 2 in the welded member 100. Also, since the pin 300 arranged along the central axis A of the screw hole 21 is used, the cancellation stress F1 that can evenly reduce delayed fracture of the three welded portions 25A is easily generated.

In the present embodiment, the welding nut 2 corresponds to one example of a welding object and a nut. The welding nut 2 and the workpiece 1 correspond to one example of a load target. The pin 300 corresponds to one example of a member arranged along the central axis A of the screw hole 21.

3. Other Embodiments

Although the embodiment of the present disclosure is described in the above, the present disclosure is not limited to the above-described embodiment, and can be practiced in various forms.

(3a) In the above-described embodiment, the pin 300 is used to apply a load along the central axis A of the screw hole 21 of the welding nut 2 to generate the cancellation stress F1. However, the way to generate the cancellation stress F1 in the welded member 100 is not limited to this.

Figure 7:
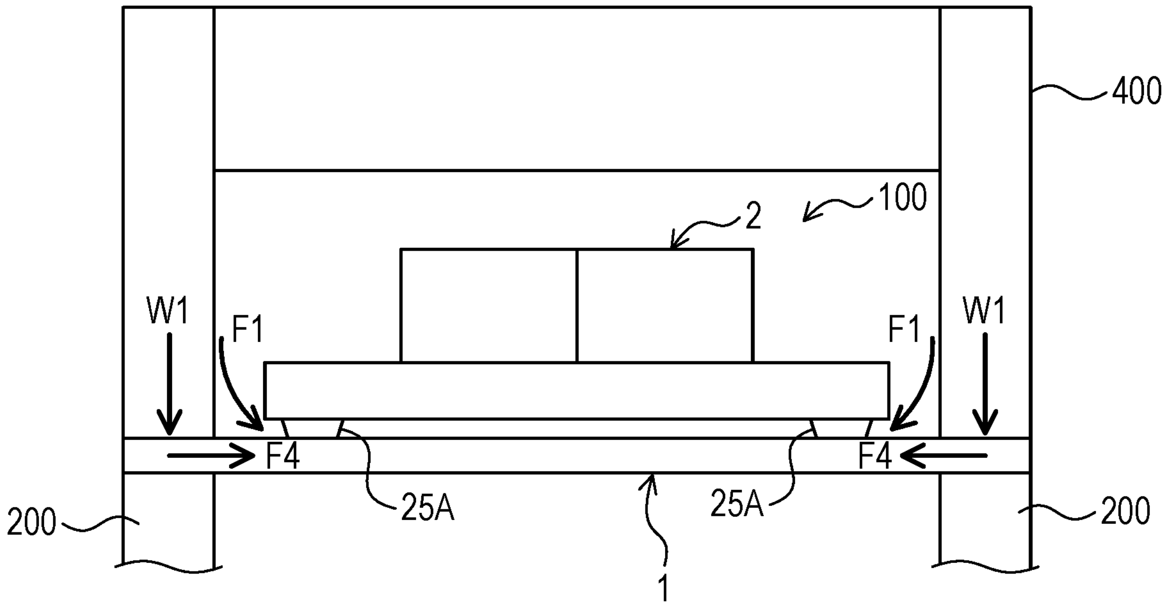
FIG. 7 is a schematic diagram showing generation of the cancellation stress by pressing surroundings of the welding nut in the workpiece to compress the workpiece in a thickness direction of the workpiece.

For example, as shown in FIG. 7, surroundings of the welding nut 2 in the workpiece 1 may be pressed with the receiving stand 200 and a pushing stand 400 to compress the workpiece 1 in the thickness direction, thereby generating the cancellation stress F1 in the welded member 100. The pushing stand 400 is arranged on the welded member 100, and is configured to contact a portion opposing to a portion of the workpiece 1 that the receiving stand 200 contacts, from a side opposite to the receiving stand 200. The pushing stand 400 may have a cylindrical shape having a top surface so as to surround the welding nut 2 from above. Specifically, an area outer than an area where the welding nut 2 is located in the workpiece 1 and in the vicinity of the welding nut 2 in the workpiece 1 is sandwiched with the receiving stand 200 and the pushing stand 400, thereby applying the load W1 o compress the workpiece 1 in the thickness direction. A stress F4 that causes the workpiece 1 to contract due to the load W1 acts around the welded portions 25A in the workpiece 1. The stress F4 acts to cause plastic deformation around the welded portions 25A in the welded member 100. Specifically, a stress that causes downward warpage and bend acts around the welded portions 25A in workpiece 1 due to the stress F4. As the workpiece 1 is warped and bent, the cancellation stress F1 is generated in the welded member 100. The shape of the receiving stand is not limited to a cylindrical shape. For example, the receiving stand may be shaped to contact the entire bottom surface of the workpiece 1 to support the welded member 100. The shape of the pushing stand is also not limited to the cylindrical shape having a top surface.

In addition, for example, in the welded member 100, although not shown, the workpiece 1 may be compressed along a direction orthogonal to the thickness direction of the workpiece 1 to generate the cancellation stress F1. In other words, in the welded member 100, the workpiece 1 may be compressed in a direction toward the center of the welding nut 2, thereby generating the cancellation stress F1. In this case as well, a stress that causes downward warpage and bend acts around the welded portions 25A in workpiece 1, as described above. This generates the cancellation stress F1 in the welded member 100.

Figure 8:
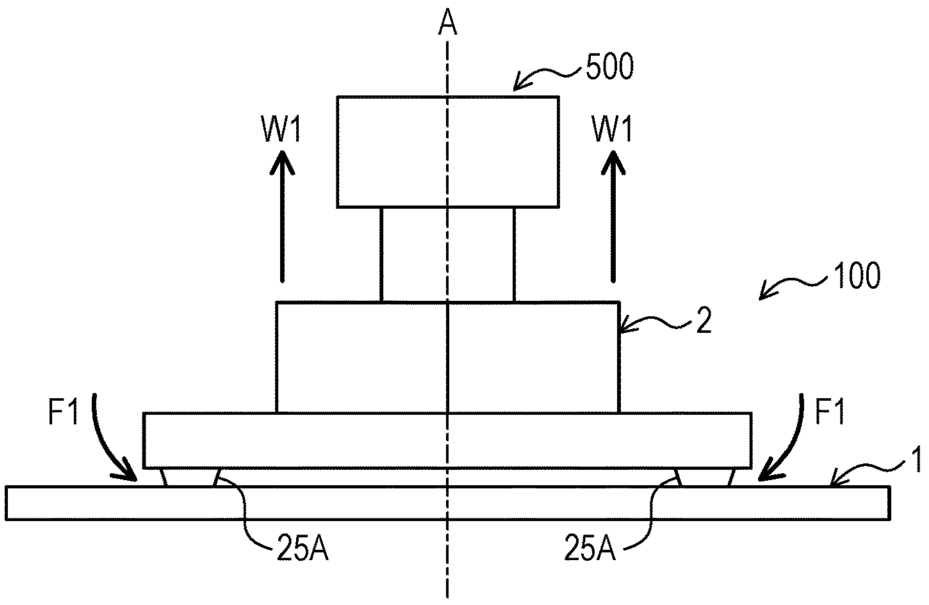
FIG. 8 is a schematic diagram showing generation of the cancellation stress by fitting a bolt into a screw hole of the welding nut and pulling the bolt in a direction in which the welding nut moves away from the workpiece.

Also, for example, in the welded member 100, as shown in FIG. 8, a bolt 500 fitted to the welding nut 2 may be used to pull the welding nut 2 in a direction away from the workpiece 1, thereby generating the cancellation stress F1. Specifically, the bolt 500 is inserted to the screw hole 21 of the welding nut 2, and, after the bolt 500 is fitted into the screw hole 21, the bolt 500 is pulled upward. This applies the load W1 to the welding nut 2 along the central axis A in a direction in which the welding nut 2 moves away from the workpiece 1. Since the welding nut 2 is pulled upward and the load W1 is applied to the welding nut 2, a stress that causes downward warpage and bend acts around the welded portions 25A in the workpiece 1. As a result, the cancellation stress F1 is generated in the welded member 100.

Figure 9:
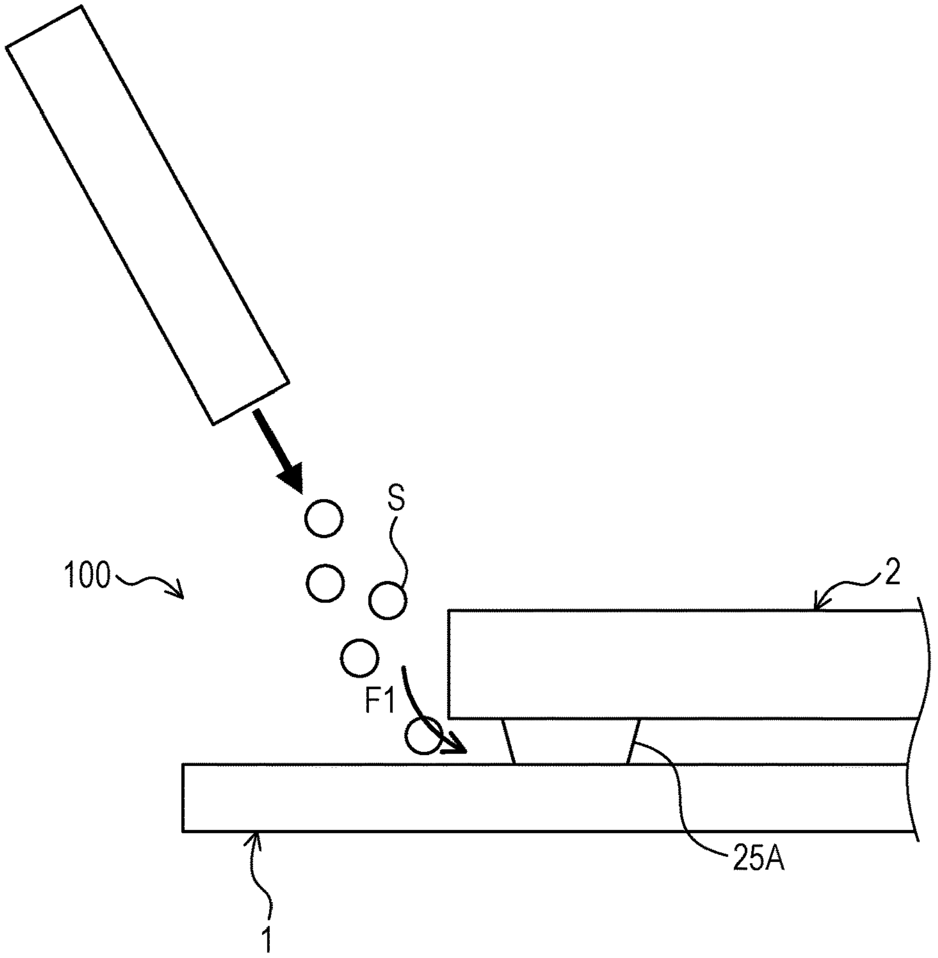
FIG. 9 is a schematic diagram showing generation of the cancellation stress by applying shot peening to the surroundings of the welding nut in the workpiece to compress the workpiece in the thickness direction.

Also, for example, in the welded member 100, shot peening may be applied to the surroundings of the welding nut 2 in the workpiece 1 to compress the workpiece 1 in the thickness direction, thereby generating the cancellation stress F1, as shown in FIG. 9. Shot peening is a process to cause countless small spheres S of steel or the like to collide at high speed to impart compressive residual stress due to plastic deformation.

(3b) In the above-described embodiment, the welding nut 2 has three projections 25, but the number of the projections 25 is not limited to this. For example, there may be two, or four or more projections.

(3c) In the above-described embodiment, the projections 25 have a triangular shape in a plane view, but the shape of the projections is not limited to this. For example, the projections may have a spherical shape that makes point contact with the workpiece 1. The projections may have a shape that makes linear contact with the workpiece 1.

(3d) In the above-described embodiment, the welding nut 2 has the flange 24, but the welding nut does not have to have a flange. That is, the above-described cancellation stress can be generated even if a welding nut having various shapes is used to perform projection welding.

(3e) In the above-described embodiment, the welded member 100 is a member in which the workpiece 1 and the welding nut 2 are welded, but the welding object to be welded to the workpiece 1 is not limited to the welding nut 2.

(3f) In the configuration of the above-described embodiment and other embodiment described in the above (3a), a load is directly applied to either one of the welding nut 2 and the workpiece 1 to generate the cancellation stress F1. However, the way to generate the cancellation stress is not limited to this. For example, the cancellation stress may be generated as a result of other processing being performed on the welded member 100 after welding, thereby indirectly applying a load.

(3g) Functions of one component in the above-described embodiments may be achieved by two or more components, and a function of one component may be achieved by two or more components. Moreover, functions of two or more components may be achieved by one component, and a function achieved by two or more components may be achieved by one component. Furthermore, part of the configurations of the above-described embodiments may be omitted. At least part of the configurations of the above-described embodiments may be added to or replaced with other configurations of the above-described embodiments. Any mode included in the technical ideas identified by the language in the claims are embodiments of the present disclosure.

What is claimed is:

1. A method for manufacturing a welded member in which a workpiece made of a high tensile material and a nut are welded, the workpiece having a plate-shape and including a first surface and a second surface that are opposite to each other in a thickness direction of the workpiece, the method comprising:

welding the workpiece and the nut such that welded portions are formed between the first surface of the workpiece and the nut by performing projection welding; and applying a cancellation stress to the welded member after the projection welding, so that a stress that is generated in the welded portions after the projection welding and acts in a direction to pull the welded portions close to each other is canceled, wherein the cancellation stress is generated by applying a load to a load target which is a target portion of the welded member to which the load is applied, wherein the load target is the nut, and wherein the cancellation stress is generated by using pin or a bolt fitted in a screw hole of the nut to apply the load to a peripheral portion of the screw hole of the nut in a direction in which the nut moves away from the workpiece.

2. The method for manufacturing the welded member according to claim 1, wherein the cancellation stress is generated by pushing the nut in the direction in which the nut moves away from the workpiece.

3. The method for manufacturing the welded member according to claim 1, wherein the cancellation stress is generated by pulling the nut in the direction in which the nut moves away from the workpiece.

4. The method for manufacturing the welded member according to claim 1, wherein the cancellation stress is generated using the pin.

5. The method for manufacturing the welded member according to claim 1, wherein the cancellation stress is generated using the bolt fitted in the screw hole of the nut.

6. A method for manufacturing a welded member in which a workpiece made of a high tensile material and a nut are welded, the workpiece having a plate-shape and including a first surface and a second surface that are opposite to each other in a thickness direction of the workpiece, the method comprising:

welding the workpiece and the nut such that welded portions are formed between the first surface of the workpiece and the nut by performing projection welding; and applying a cancellation stress to the welded member after the projection welding, so that a welding stress that is generated in the welded portions after the projection welding and acts in a direction to pull the welded portions close to each other is canceled, wherein the cancellation stress is generated by applying a load to a load target which is a target portion of the welded member to which the load is applied, wherein the load target is the workpiece, and wherein the cancellation stress is generated by compressing an area of the workpiece surrounding the nut in a thickness direction of the workpiece by:

pressing the area of the workpiece between a receiving stand and a pushing stand; or shot peening the first surface of the workpiece in the area, so as to create a force in the workpiece that is opposite to the direction of the welding stress.

7. The method for manufacturing the welded member according to claim 6, wherein compressing the workpiece comprises compressing the workpiece between the receiving stand and the pushing stand.

8. The method for manufacturing the welded member according to claim 6, wherein compressing the workpiece comprises shot peening the first surface in the area of the workpiece surrounding the nut.

* * * * *